US012597749B2

(12) United States Patent
Sun et al.

(10) Patent No.: US 12,597,749 B2
(45) Date of Patent: Apr. 7, 2026

(54) REPLACEABLE LOW VOLTAGE CONNECTOR ADAPTER WITH INTEGRATED FUSE DESIGN

(71) Applicant: FCA US LLC, Auburn Hills, MI (US)

(72) Inventors: Caizhen Sun, Shanghai (CN); Jingjing Zhao, Shanghai (CN); Huiyang Yu, Shanghai (CN); Weisi Gu, Shanghai (CN); Cuicui Zhang, Shanghai (CN); Xinjie Liu, Shanghai (CN)

(73) Assignee: FCA US LLC, Auburn Hills, MI (US)

( * ) Notice: Subject to any disclaimer, the term of this patent is extended or adjusted under 35 U.S.C. 154(b) by 372 days.

(21) Appl. No.: 18/337,812

(22) Filed: Jun. 20, 2023

(65) Prior Publication Data

US 2024/0429667 A1    Dec. 26, 2024

(51) Int. Cl.
| | |
|---|---|
| *H01R 31/06* | (2006.01) |
| *B60L 3/04* | (2006.01) |
| *H01R 43/26* | (2006.01) |
| *H01R 13/04* | (2006.01) |

(52) U.S. Cl.
CPC .............. H01R 31/065 (2013.01); B60L 3/04 (2013.01); H01R 43/26 (2013.01); *H01R 13/04* (2013.01); *H01R 2201/26* (2013.01)

(58) Field of Classification Search
CPC ...... H01R 31/065; H01R 43/26; H01R 13/04; H01R 2201/26; B60L 3/04
See application file for complete search history.

(56) References Cited

U.S. PATENT DOCUMENTS

| | | | | |
|---|---|---|---|---|
| 6,116,916 A * | 9/2000 | Kasai | ..................... | H01R 9/226 |
| | | | | 361/826 |
| 6,280,253 B1 * | 8/2001 | Kraus | .................... | H01R 29/00 |
| | | | | 439/594 |
| 6,659,782 B2 * | 12/2003 | Wu | ....................... | H01R 31/065 |
| | | | | 439/131 |
| 7,249,956 B2 * | 7/2007 | Ishiguro | ............... | H01R 9/2458 |
| | | | | 439/949 |
| 8,027,168 B2 * | 9/2011 | Senk | ................... | B60R 16/0238 |
| | | | | 361/755 |
| 8,426,752 B2 * | 4/2013 | Hashikura | .......... | H05K 7/20854 |
| | | | | 174/541 |

(Continued)

FOREIGN PATENT DOCUMENTS

| | | |
|---|---|---|
| EP | 3772151 A1 | 2/2021 |
| KR | 20200109628 A | 9/2020 |

*Primary Examiner* — Thanh Tam T Le
(74) *Attorney, Agent, or Firm* — Jeremy J. Klobucar

(57) ABSTRACT

Systems and methods for an adapter for a high voltage (HV) battery system of an electrified vehicle (EV) involve an adapter housing configured to physically interface between (i) a battery module-side low voltage (LV) connector and (ii) a cell monitoring circuit (CMC) harness-side LV connector and a plurality of connector pins disposed within the adapter housing and being configured to, at their first ends, electrically connect to the module-side LV connector, at their opposing second ends, electrically connect to the harness-side LV connector, and act as a fuse such that at least one of the plurality of connector pins breaks an electrical connection therethrough in response to a current spike. In response to a blown fuse malfunction, the adapter could be replaced by a new adapter having a new adapter housing with a new plurality of connector pins disposed therein.

20 Claims, 4 Drawing Sheets

(56) References Cited

U.S. PATENT DOCUMENTS

| | | | |
|---|---|---|---|
| 8,698,346 B2 | 4/2014 | Kamaga | |
| 8,708,715 B2 * | 4/2014 | Kobayashi | B60R 16/0238 |
| | | | 439/949 |
| 8,808,031 B2 * | 8/2014 | Zhao | H01M 10/425 |
| | | | 439/620.33 |
| 9,493,083 B1 * | 11/2016 | Sumner | H01R 13/6272 |
| 9,735,529 B2 * | 8/2017 | Schaible | H02K 11/30 |
| 9,806,470 B2 * | 10/2017 | Okamoto | H01M 50/503 |
| 9,991,657 B2 * | 6/2018 | Powers | H01R 31/06 |
| 10,259,336 B2 | 4/2019 | McQuillen et al. | |
| 10,667,413 B1 * | 5/2020 | Carnick | B60R 16/0238 |
| 11,351,877 B2 | 6/2022 | Koolen et al. | |
| 2016/0362016 A1 | 12/2016 | Khoo et al. | |
| 2019/0184849 A1 | 6/2019 | Lim | |
| 2021/0354575 A1 | 11/2021 | Vahedi et al. | |

* cited by examiner

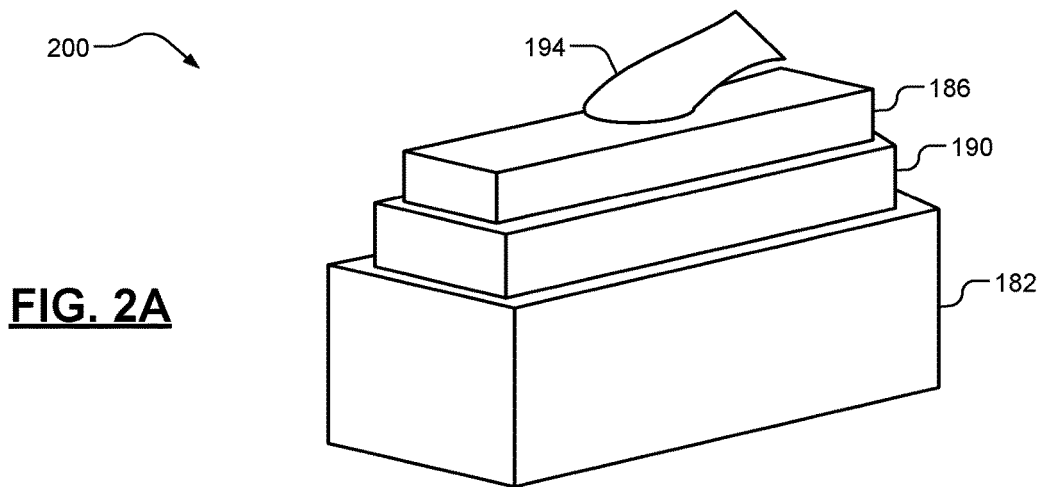
FIG. 2A
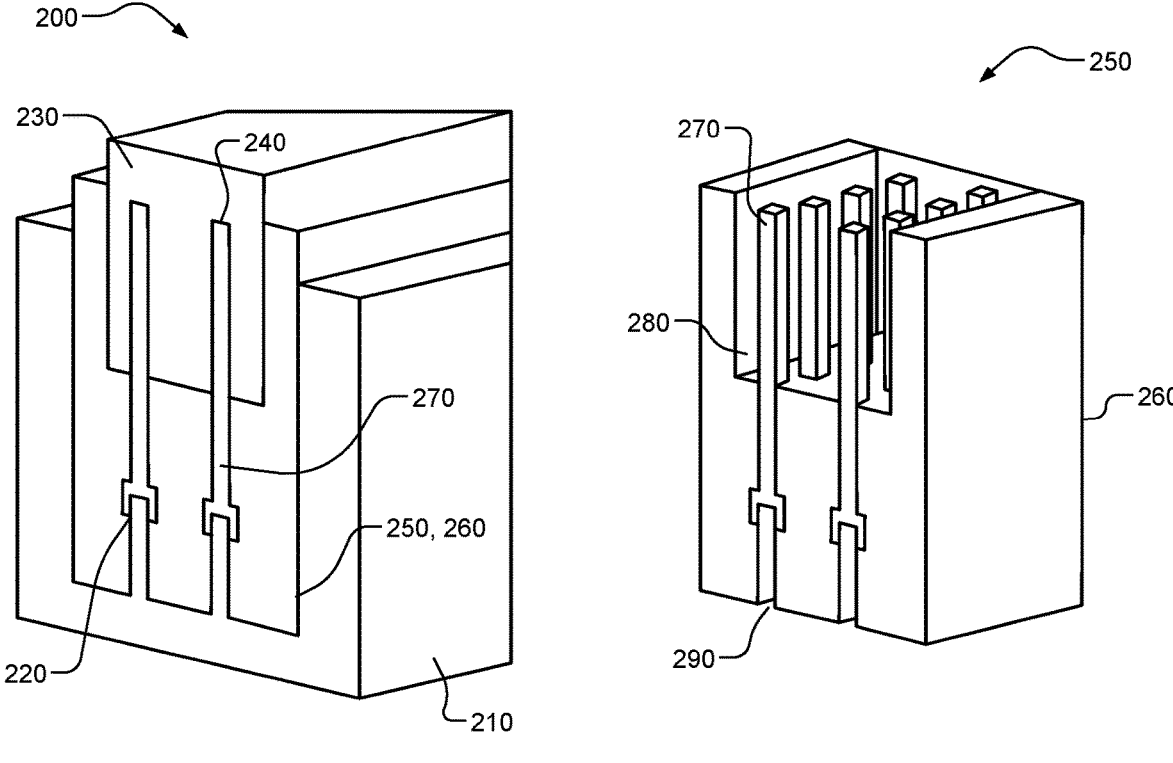
FIG. 2B          FIG. 2C

REPLACEABLE LOW VOLTAGE CONNECTOR ADAPTER WITH INTEGRATED FUSE DESIGN

FIELD

The present application generally relates to electrified vehicles (EVs) and, more particularly, to a replaceable low voltage (LV) connector adapter with an integrated fuse design for EV high voltage (HV) battery systems.

BACKGROUND

An electrified vehicle (EV) includes a high voltage (HV) battery system that outputs current to power one or more electric traction motors for vehicle propulsion. They HV battery system typically comprises a plurality of battery modules or "cell blocks". Each battery module further comprises a set of one or more battery cells (e.g., lithium-ion, or Li-ion cell(s)) and a control circuit for charging and discharging thereof. Each battery module further comprises a flexible printed circuit (FPC) having a sampling circuit that is configured to monitor critical parameters of the respectively battery cell(s), such as voltage and temperature. In conventional HV battery systems of EVs, each FPC has an integrated fuse to protect the important sampling circuit. When this integrated fuse malfunctions (e.g., a blown fuse), the entire battery module or cell block must be replaced, which is very costly. Accordingly, while such conventional EV HV battery systems do work well for their intended purpose, there exists an opportunity for improvement in the relevant art.

SUMMARY

According to one example aspect of the invention, an adapter for a high voltage (HV) battery system of an electrified vehicle (EV) is presented. In one exemplary implementation, the adapter comprises an adapter housing configured to physically interface between (i) a module-side low voltage (LV) connector electrically connected to a battery module of the HV battery system and (ii) a harness-side LV connector electrically connected to a cell monitoring circuit (CMC) for the battery module, and a plurality of connector pins disposed within the adapter housing and being configured to, at their first ends, electrically connect to the module-side LV connector, at their opposing second ends, electrically connect to the harness-side LV connector, and act as a fuse such that at least one of the plurality of connector pins breaks an electrical connection therethrough in response to a current spike.

In some implementations, the plurality of connector pins each has a narrow-neck design. In some implementations, the battery module comprises a flexible printed circuit (FPC) configured as a sampling circuit for a set of parameters of a set of battery cells of the battery module. In some implementations, the battery module and the FPC do not include a fuse. In some implementations, the HV battery system includes a plurality of battery modules connected in series and each battery module includes a set of battery cells and a respective FPC, wherein the plurality of CMCs are in communication with a battery monitoring system (BMS).

In some implementations, the adapter housing and the plurality of connector pins disposed therein are separately replaceable from the battery module. In some implementations, the adapter housing and the plurality of connector pins disposed therein are configured to be physically separated from the module-side LV connector and the harness-side LV connector to detect a blown fuse malfunction and, in response to detecting the blown fuse malfunction, to be replaced by a new adapter housing and a new plurality of connector pins disposed therein.

According to another example aspect of the invention, a method of installing/connecting and replacing an adapter for HV battery system of an EV is presented. In one exemplary implementation, the method comprises providing an adapter comprising an adapter housing and a plurality of connector pins disposed within the adapter housing, the plurality of pins being configured to act as a fuse such that at least one of the plurality of connector pins breaks an electrical connection therethrough in response to a current spike and installing/connecting the adapter in the HV battery system such that the adapter housing physically interfaces between (i) a module-side LV connector electrically connected to a battery module of the HV battery system and (ii) a harness-side LV connector electrically connected to a CMC for the battery module and the plurality of connector pins, at their first ends, electrically connect to the module-side LV connector and, at their opposing second ends, electrically connect to the harness-side LV connector.

In some implementations, the plurality of connector pins each has a narrow-neck design. In some implementations, the battery module comprises a FPC configured as a sampling circuit for a set of parameters of a set of battery cells of the battery module. In some implementations, the battery module and the FPC do not include a fuse. In some implementations, the HV battery system includes a plurality of battery modules connected in series and each battery module includes a set of battery cells and a respective FPC, wherein the plurality of CMCs are in communication with a BMS.

In some implementations, the adapter housing and the plurality of connector pins disposed therein are separately replaceable from the battery module. In some implementations, the method further comprises uninstalling/disconnecting the adapter the adapter from the HV battery system, and in response to detecting the blown fuse malfunction, replacing and installing/connecting new adapter in the HV battery system, the new adapter comprising a new adapter housing and a new plurality of connector pins disposed therein and configured to act as a fuse such that at least one of the new plurality of connector pins breaks an electrical connection therethrough in response to a current spike.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIGS. 2A-2C are perspective and cross-sectional views of an example configuration of the replaceable adapter for an HV battery system according to the principles of the present application.

DESCRIPTION

As previously discussed, an electrified vehicle (EV) includes a high voltage (HV) battery system that outputs current to power one or more electric traction motors for vehicle propulsion. They HV battery system typically comprises a plurality of battery modules or "cell blocks". Each battery module further comprises a set of one or more battery cells (e.g., lithium-ion, or Li-ion cell(s)) and a control circuit for charging and discharging thereof. Each battery module further comprises a flexible printed circuit (FPC) having a sampling circuit that is configured to monitor critical parameters of the respectively battery cell(s), such as voltage and temperature.

In conventional battery systems, each FPC has an integrated fuse to protect the important sampling circuit. For example, each FPC could be welded onto a respective battery module busbar. When this integrated fuse malfunctions (e.g., a blown fuse), the entire battery module or cell block must be replaced, which is very costly. Thus, while such conventional HV battery systems do work well for their intended purpose, there exists an opportunity for improvement in the relevant art.

The present application is therefore directed to a replaceable adapter with an integrated fuse design for a HV battery system of an EV and a method for connecting/installing and replacing the same. This adapter is configured to connect between the battery module-side low voltage (LV) connector and the respective harness-side LV connector (a cell monitoring circuit (CMC), the battery management system (BMS), etc.). The adapter includes a plurality of pins each having a narrow neck design that allows them to function as a fuse (i.e., one or more pins will physically break due to current spikes). When a blown fuse malfunction occurs, the entire adapter is replaceable, which decreases replacement time and costs. This also allows for a simpler or less complex FPC layout/design (i.e., no integrated fuse). Potential benefits include reduced original part designs and costs, as well as decreased replacement and warranty costs over time. It will also be appreciated that the applicability of this solution should last for or otherwise be relevant for a very long time because the sampling circuit protection requirement is an essential requirement for HV battery systems, e.g., as specified by the Society of Automotive Engineers (SAE) EV standards.

Figure 1A:
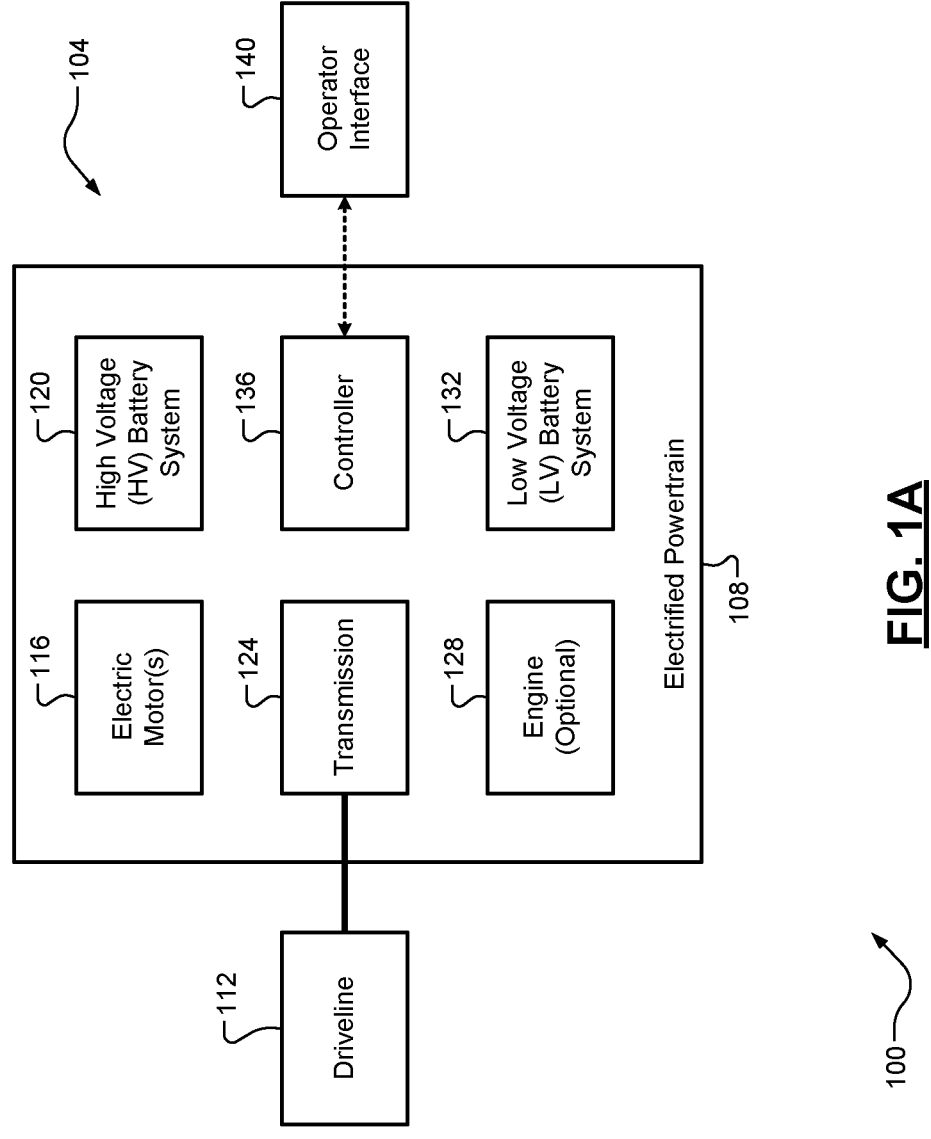
FIGS. 1A-1B are functional block diagrams of an electrified vehicle (EV) and a high voltage (HV) battery system including a replaceable adapter according to the principles of the present application.
Figure 1B:
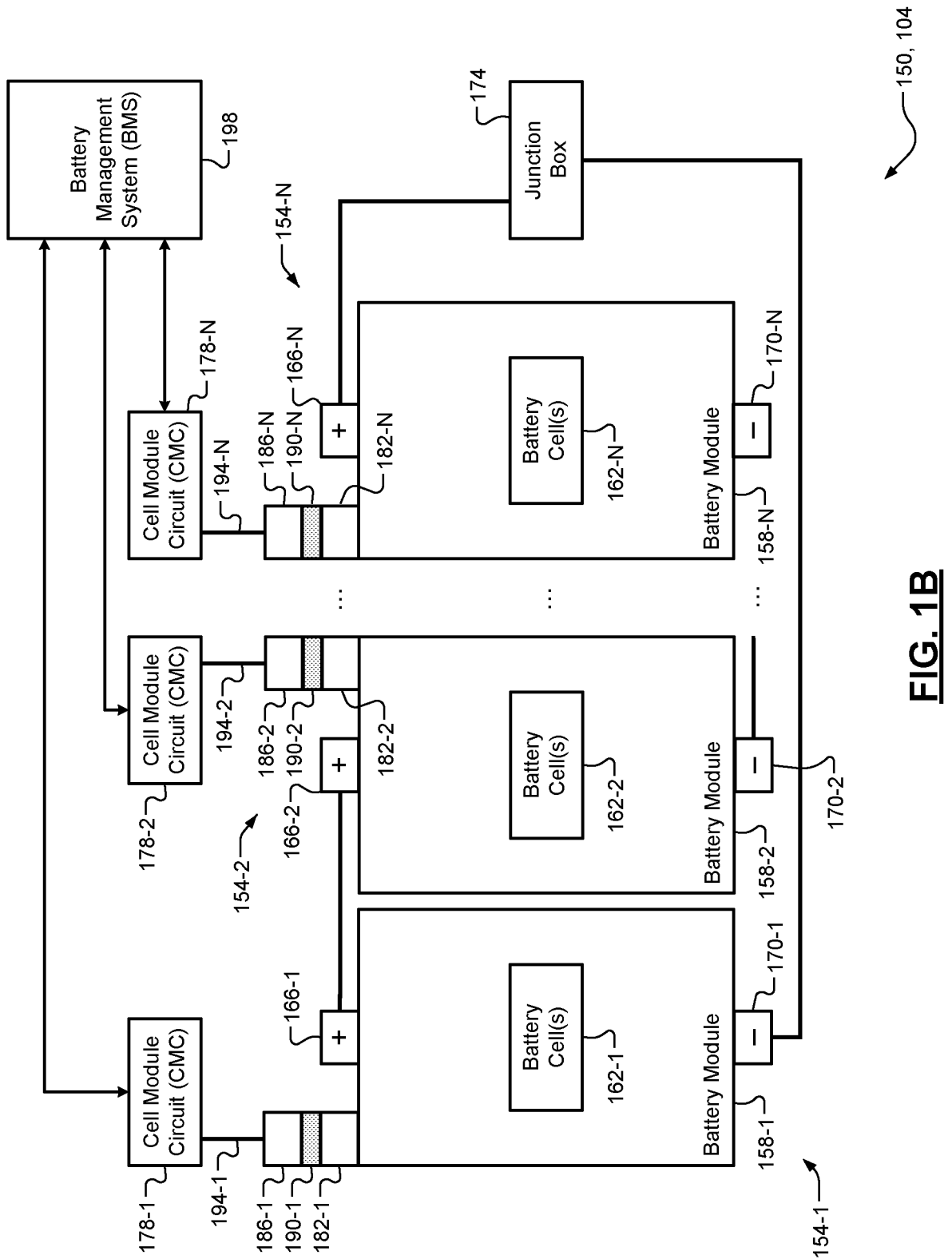
Figure 3:
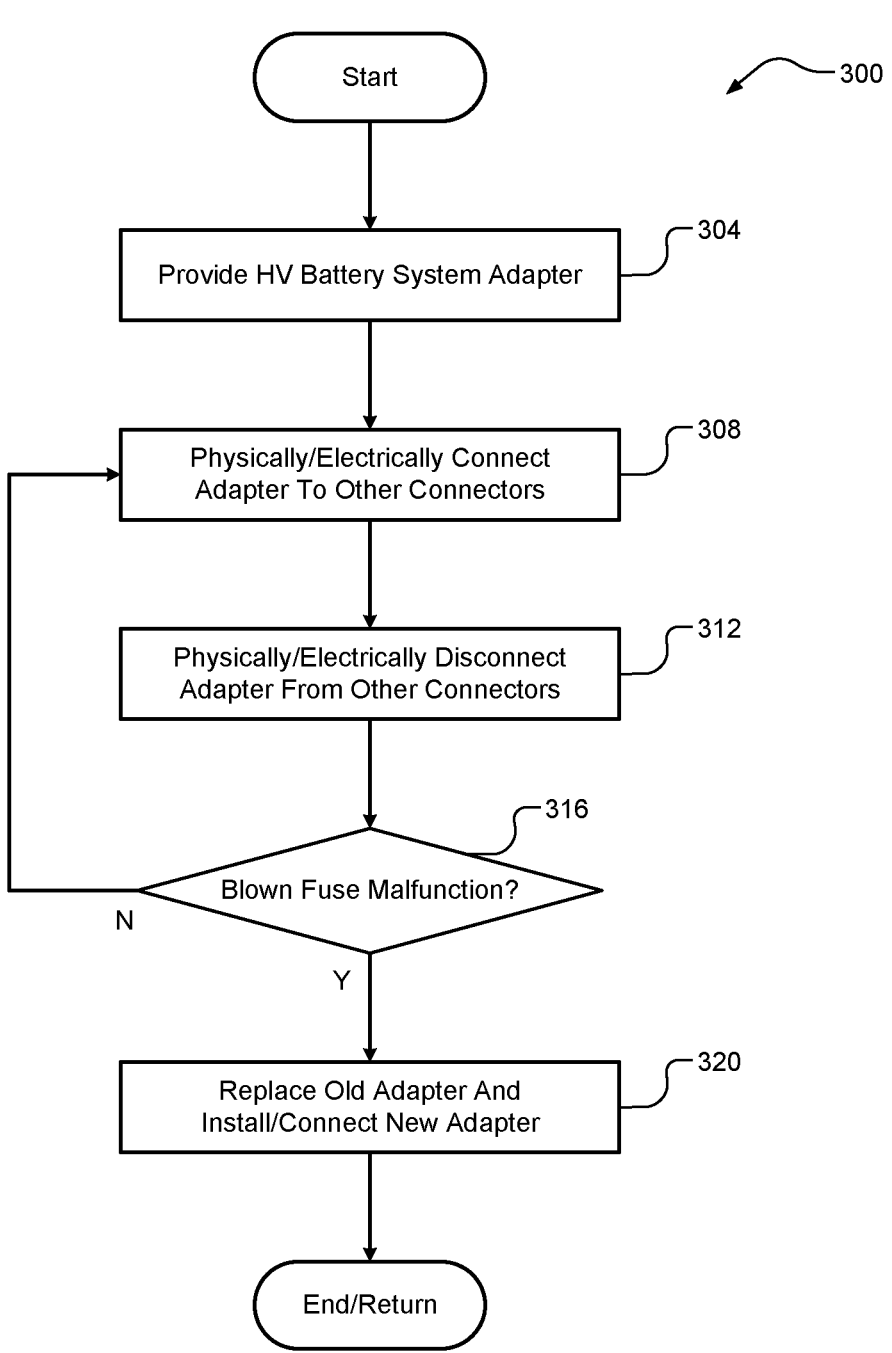
FIG. 3 is a flow diagram of an example HV battery system adapter connection and replacement method according to the principles of the present application.

Referring now to FIG. 1A, a functional block diagram of an EV 100 having an example HV battery system 104 according to the principles of the present application is illustrated. The EV 100 comprises an electrified powertrain 108 configured to generate and transfer drive torque to a driveline 112 for vehicle propulsion. The electrified powertrain 108 includes one or more electric motors 116 (e.g., electric traction motors) configured to generate mechanical drive torque in response to electrical energy (e.g., current) supplied by the high voltage (HV) battery system 104. The HV battery system 104 comprises a plurality of battery modules or "cell blocks" and respective control circuitry that is shown in FIG. 1B and described in greater detail below. A transmission 124 (e.g., an automatic transmission) is configured to transfer the drive torque from the electric motor(s) 116 to the driveline 112. In some implementations, the EV 100 could be a battery electric vehicle (BEV) that does not include any other torque generating systems.

In other implementations, the electrified powertrain 108 could optionally include an internal combustion engine 128 configured to combust a mixture of air and fuel (gasoline, diesel, etc.) to generate mechanical drive torque for vehicle propulsion and/or for conversion to electrical energy (e.g., for battery system recharging). An LV battery system 132 (e.g., a 12V battery) is configured to power low voltage accessory loads of the EV 100. A controller 136 is configured to control operation of the EV 100 and, more particularly, control the electrified powertrain 108 to generate an amount of drive torque to satisfy an operator torque request, such as a torque request provided via an operator (driver) interface 140 (e.g., an accelerator pedal).

In some implementations, the EV 100 is a rechargeable EV, also commonly referred to as a plug-in electric vehicle (PEV) or plug-in hybrid electric vehicle (PHEV). The electrified powertrain 108 or a separate system of the EV 100 could include other non-illustrated components, such as an on-board charging module (OBCM), also often referred to as an integrated dual charging module (IDCM), that is configured to control the recharging of the EV 100 via electrified vehicle supply equipment (EVSE), such as a charging station, a charging cable, and the like.

Referring now to FIG. 1B and with continued reference to FIG. 1A, a functional block diagram of an example configuration 150 of the HV battery system 104 according to the principles of the present application is illustrated. Per the illustrated configuration 150, the HV battery system 104 includes a plurality of LV battery module systems 154-1 . . . . 154-N, where N is an integer greater than one (collectively, LV battery module systems 154). Each of the other components of the illustrated configuration 150 also ranges from 1 . . . . N and can be generically referenced in a similar manner. Each LV battery module system 154 comprises a respective LV battery module 158 including a respective set of one or more LV battery cells 162, a respective positive terminal 166, and a respective negative terminal 170. The LV battery modules 158 are connected in series at a junction box 174 and collectively output a HV level voltage (e.g., ~400V) for powering the electric motor(s) 116 of the EV 100. Each LV battery module 158 also has a respective FPC (not shown) configured as a sampling circuit to measure and monitor key or critical parameters (voltage, temperature, etc.) of the respective LV battery cells 162.

Each LV battery module system 154 also has a respective cell monitoring circuit (CMC) 178 for monitoring these measured parameters of the respective LV battery cells 162 (voltage, temperature, etc.) and the CMCs 178 are all in communication with a battery management system (BMS) 198 that oversees/controls operation of the entire HV battery system 104. The present application is primarily directed to a replaceable adapter 190 for each LV battery module system 154 and LV battery module 158. More specifically, this replaceable adapter 190 is configured to physically and electrically connect/interface between (i) a respective module-side LV connector 182 coupled or connected to the LV battery module 158 and (ii) a respective harness-side LV connector 186 coupled or connected to a respective CMC 178 via a respective wire harness/cable 194. Rather than an FPC of each LV battery module 158 including a non-replaceable fuse, this replaceable adapter 190 includes a plurality of pins that act as a fuse by breaking an electrical connection therethrough in response to a current spike.

Referring now to FIGS. 2A-2C and FIG. 3 and with continued reference to FIGS. 1A-1B, perspective and cross-sectional views of an example configuration 200 of the adapter 190 and a corresponding connection and replacement method 300 for an EV according to the principles of the present application are illustrated. It will be appreciated that the perspective and cross-sectional views of FIGS. 2A-2C are merely exemplary drawings for illustrative and descriptive purposes and the components of the HV battery system 104 including the adapter 250 could have a much different aesthetic design. Additionally, while the EV 100 and its components (e.g., HV battery system 104) are specifically referenced for illustrative/explanatory purposes, it will be appreciated that this method 300 could be applicable to any suitable EV having a suitable HV battery system. At 304, the adapter 190, 250 comprising the adapter housing 260 and a plurality of connector pins 270 disposed within this adapter housing 260 is initially provided.

At 308, the adapter 250 is physically and electrically connected between the module-side LV connector 182, 210 electrically connected to a respective HV battery module 154 and (ii) the harness-side LV connector 186, 230 electrically connected to the respective CMC 178 and cable 194, such that the plurality of connector pins 270, at their first ends 220, electrically connect to the module-side LV connector 182, 210 and, at their opposing second ends 240, electrically connect to the harness-side LV connector 186, 230.

The plurality of connector pins 270 are also configured to act as a fuse (e.g., due to a narrow neck, elongated design) such that at least one of the plurality of connector pins 270 breaks an electrical connection therethrough in response to a current spike (e.g., that would normally blow or otherwise cause a malfunction of a traditional fuse). As previously discussed, in conventional designs, wherein each battery module 154 would include an FPC having a sampling circuit therein and an integrated fuse. As shown, the battery module 154 only includes its battery cell(s) 158 and does include an FPC (e.g., a sampling circuit) with an integrated fuse as is traditionally done in the prior art.

The adapter 250 of the present application, including its plurality of connector pins 270, are separately replaceable from the module-side LV connector 182, 210 and the harness-side LV connector 186, 230. More specifically, at 312, the adapter 250 is physically and electrically separable from the module-side LV connector 182, 210 and the harness-side LV connector 186, 230 to detect a blown fuse malfunction of the plurality of connector pins 270. It will be appreciated that the blown fuse malfunction could also be diagnosed or detected without physically disconnecting and removing the adapter 250 as current would not be flowing therethrough. When the blown fuse malfunction is confirmed, the method 300 proceeds to 316 where the adapter 250 is replaced with a new adapter comprising a new housing and a new plurality of connector pins disposed therein. Otherwise (i.e., when there is no blown fuse malfunction), the adapter 250 could be physically and electrically reconnected. If some other sort of malfunction still exists or persists, it could be deduced to be a malfunction other than a blown fuse malfunction. The method 300 then ends or returns to 304 for one or more additional cycles.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An adapter for a high voltage (HV) battery system of an electrified vehicle (EV), the adapter comprising:
   an adapter housing configured to physically interface between (i) a module-side low voltage (LV) connector electrically connected to a battery module of the HV battery system and (ii) a harness-side LV connector electrically connected to a cell monitoring circuit (CMC) for the battery module; and
   a plurality of connector pins disposed within the adapter housing and being configured to:
      at first ends of the plurality of connector pins, electrically connect to the module-side LV connector;
      at opposing second ends of the plurality of connector pins, electrically connect to the harness-side LV connector; and
      act as a fuse such that at least one of the plurality of connector pins breaks an electrical connection therethrough in response to a current spike,
   wherein the adapter does not include a separate fuse between the module-side LV connector and the harness-side LV connector.

2. The adapter of claim 1, wherein the plurality of connector pins each has an elongated narrow-neck design including, at each respective first end, a first portion having a first cross-sectional area and, at each respective second end, a second portion having a second cross-sectional area, wherein the first cross-sectional area is greater than the second cross-sectional area.

3. The adapter of claim 2, wherein the first portion of each connector pin of the plurality of connector pins defines a recess for receiving respective connector pin of the module-side LV connector.

4. The adapter of claim 2, wherein each connector pin defines a square-shaped cross-section.

5. The adapter of claim 1, wherein the battery module comprises a flexible printed circuit (FPC) configured as a sampling circuit for a set of parameters of a set of battery cells of the battery module.

6. The adapter of claim 5, wherein the battery module and the FPC do not include a fuse.

7. The adapter of claim 5, wherein the HV battery system includes a plurality of battery modules connected in series and each battery module includes a set of battery cells and a respective FPC, wherein the plurality of CMCs are in communication with a battery monitoring system (BMS).

8. The adapter of claim 1, wherein the adapter housing and the plurality of connector pins disposed therein are separately replaceable from the battery module.

9. The adapter of claim 8, wherein the adapter housing and the plurality of connector pins disposed therein are configured to be physically separated from the module-side LV connector and the harness-side LV connector to detect a blown fuse malfunction and, in response to detecting the blown fuse malfunction, to be replaced by a new adapter housing and a new plurality of connector pins disposed therein.

10. The adapter of claim 1, wherein the adapter is configured to be directly connected to both the module-side LV connector and the harness-side LV connector, and wherein the module side-LV connector and the harness-side LV connector are directly connected to the battery module and the CMC, respectively.

11. A method of installing/connecting and replacing an adapter for a high voltage (HV) battery system of an electrified vehicle (EV), the method comprising:

providing an adapter comprising an adapter housing and a plurality of connector pins disposed within the adapter housing, the plurality of pins being configured to act as a fuse such that at least one of the plurality of connector pins breaks an electrical connection therethrough in response to a current spike; and installing/connecting the adapter in the HV battery system such that:

the adapter housing physically interfaces between (i) a module-side low voltage (LV) connector electrically connected to a battery module of the HV battery system and (ii) a harness-side LV connector electrically connected to a cell monitoring circuit (CMC) for the battery module, and at first ends of the plurality of connector pins electrically connect to the module-side LV connector and, at opposing second ends of the plurality of connector pins, electrically connect to the harness-side LV connector, wherein the adapter does not include a separate fuse between the module-side LV connector and the harness-side LV connector.

12. The method of claim 11, wherein the plurality of connector pins each has an elongated narrow-neck design including, at each respective first end, a first portion having a first cross-sectional area and, at each respective second end, a second portion having a second cross-sectional area, wherein the first cross-sectional area is greater than the second cross-sectional area.

13. The method of claim 12, wherein the first portion of each connector pin of the plurality of connector pins defines a recess for receiving respective connector pin of the module-side LV connector.

14. The method of claim 12, wherein each connector pin defines a square-shaped cross-section.

15. The method of claim 11, wherein the battery module comprises a flexible printed circuit (FPC) configured as a sampling circuit for a set of parameters of a set of battery cells of the battery module.

16. The method of claim 15, wherein the battery module and the FPC do not include a fuse.

17. The method of claim 15, wherein the HV battery system includes a plurality of battery modules connected in series and each battery module includes a set of battery cells and a respective FPC, wherein the plurality of CMCs are in communication with a battery monitoring system (BMS).

18. The method of claim 11, wherein the adapter housing and the plurality of connector pins disposed therein are separately replaceable from the battery module.

19. The method of claim 18, further comprising:

uninstalling/disconnecting the adapter the adapter from the HV battery system; and in response to detecting the blown fuse malfunction, replacing and installing/connecting new adapter in the HV battery system, the new adapter comprising a new adapter housing and a new plurality of connector pins disposed therein and configured to act as a fuse such that at least one of the new plurality of connector pins breaks an electrical connection therethrough in response to a current spike.

20. The method of claim 11, wherein the installing/connecting of the adapter is such that the adapter is directly connected to both the module-side LV connector and the harness-side LV connector, and wherein the module side-LV connector and the harness-side LV connector are directly connected to the battery module and the CMC, respectively.

* * * * *